(12) United States Patent
Stewart

(10) Patent No.: US 6,868,725 B2
(45) Date of Patent: Mar. 22, 2005

(54) HINGE POSITION LOCATION THAT CAUSES PENDULOUS AXIS TO BE SUBSTANTIALLY PARALLEL WITH DRIVE COMPONENT DIRECTION

(75) Inventor: Robert E. Stewart, Woodland Hills, CA (US)

(73) Assignee: Northrop Grumman Corporation, Woodland Hills, CA (US)

( * ) Notice: Subject to any disclaimer, the term of this patent is extended or adjusted under 35 U.S.C. 154(b) by 0 days.

(21) Appl. No.: 10/666,683

(22) Filed: Sep. 18, 2003

(65) Prior Publication Data

US 2004/0226372 A1 Nov. 18, 2004

Related U.S. Application Data

(60) Provisional application No. 60/464,722, filed on Apr. 23, 2003.

(51) Int. Cl.$^7$ .......................... G01C 19/00; G01P 15/08; G01P 3/44; G01P 9/00; G01P 15/00
(52) U.S. Cl. ............................... 73/504.12; 73/514.36; 73/514.38
(58) Field of Search ..................... 73/514.21, 504.12, 73/514.36, 514.38, 514.23

(56) References Cited

U.S. PATENT DOCUMENTS

| | | | |
|---|---|---|---|
| 5,331,854 A | 7/1994 | Hulsing, II | |
| 6,474,160 B1 | 11/2002 | Stewart et al. | |
| 6,595,056 B2 | 7/2003 | Stewart | 73/514.29 |
| 6,619,121 B1 * | 9/2003 | Stewart et al. | 73/504.02 |

* cited by examiner

Primary Examiner—Hezron Williams
Assistant Examiner—Tamiko Bellamy
(74) Attorney, Agent, or Firm—Patti & Brill, LLC

(57) ABSTRACT

A drive component that comprises a drive axis, a pendulous sensor component that comprises a center of mass, and a hinge component that comprises a rotation axis of an electromechanical system. The drive component makes a determination of a drive direction. Upon the determination of the drive direction, the drive component determines an alignment of a pendulous axis, that intersects the center of mass of the pendulous sensor component and the rotation axis of the hinge component, with the drive axis of the drive component. The drive component and the pendulous sensor component are coupled with the hinge component. A location of the hinge component causes the alignment of the pendulous axis to be substantially parallel with the drive direction of the drive component.

20 Claims, 1 Drawing Sheet

HINGE POSITION LOCATION THAT CAUSES PENDULOUS AXIS TO BE SUBSTANTIALLY PARALLEL WITH DRIVE COMPONENT DIRECTION

CROSS-REFERENCE TO RELATED APPLICATIONS

This application claims the priority of U.S. provisional Patent Application Ser. No. 60/464,722 (by Robert E. Stewart, filed Apr. 23, 2003, and entitled "HINGE POSITION LOCATION THAT CAUSES PENDULOUS AXIS TO BE SUBSTANTIALLY PARALLEL WITH DRIVE COMPONENT DIRECTION").

In addition, this application contains subject matter that is related to the subject matter of the following application, which is assigned to the same assignee as this application. The below-listed application is hereby incorporated herein by reference in its entirety:

"PICKOFF SENSOR OBTAINING OF VALUE OF PARAMETER FROM SUBSTANTIALLY ZERO NET DAMPENING TORQUE LOCATION OF PENDULOUS SENSOR COMPONENT," by Stanley F. Wyse, co-filed herewith.

TECHNICAL FIELD

The invention relates generally to electromechanical systems and more particularly to quadrature reduction in electromechanical systems.

BACKGROUND

An electromechanical system in one example measures a parameter. For example, the electromechanical system comprises a micro-electromechanical system ("MEMS") gyroscope that measures a rotation. The gyroscope in one example comprises a pendulous sensor component, a dither drive component, and a pickoff sensor. The dither drive component operates along a dither drive axis to set the pendulous sensor component into oscillation. The pendulous sensor component reacts to the rotation. The pickoff sensor senses the reaction of the pendulous sensor component to the rotation and a restoring force is provided by servo control electronics to restore and maintain the pickoff sensor signal at null.

A large source of bias error in Coriolis based micro-electromechanical system gyroscopes is the instability and non-repeatability of a component of the quadrature servo rebalance signal that appears in phase with the angular rate rebalance due to a remodulation phase error. Misalignment between the dither drive axis and an acceleration sensitive axis of the pendulous sensor component results in forces acting on the pendulous sensor component in the micro-electromechanical system gyroscope that are in quadrature with the desired rotation induced Coriolis forces. The misalignment in one example is caused by a non-vertical deep reactive ion etching of a dither beam suspension of the dither drive component during fabrication. Changes in the misalignment or the phase of remodulation result in bias error. As one shortcoming, the quadrature introduced by the misalignment between the dither drive axis and the acceleration sensitive axis of the pendulous sensor component coupled with phase error in remodulation results in an increased bias error.

Thus, a need exists for a reduction of a quadrature introduced by misalignment in electromechanical systems.

SUMMARY

The invention in one implementation encompasses a system. The system comprises a drive component that comprises a drive axis, a pendulous sensor component that comprises a center of mass, and a hinge component that comprises a rotation axis. The drive component makes a determination of a drive direction. Upon the determination of the drive direction, the drive component determines an alignment of a pendulous axis, that intersects the center of mass of the pendulous sensor component and the rotation axis of the hinge component, with the drive axis of the drive component. The drive component and the pendulous sensor component are coupled with the hinge component. A location of the hinge component causes the alignment of the pendulous axis to be substantially parallel with the drive direction of the drive component.

In another implementation, the invention encompasses a method. An electromechanical system comprises a drive component that comprises a major axis and one or more dither beams. The drive component actuates a pendulous sensor component that comprises a center of mass. An alignment between the major axis and the one or more dither beams is determined. A drive direction of the drive component is identified based on the alignment between the major axis and the one or more dither beams. A hinge, that connects the drive component and the pendulous sensor component, is positioned at a location that causes a pendulous axis, that intersects a rotation axis of the hinge and the center of mass of the pendulous sensor component, to be substantially parallel with the drive direction of the drive component.

A further implementation of the invention encompasses a process. One or more dither beams of a drive component are etched with a deep reactive ion process. A pendulous axis, that intersects a center of mass of a pendulous sensor component and a rotation axis of a hinge component, is aligned with a drive axis through employment of the deep reactive ion process.

DESCRIPTION OF THE DRAWINGS

Features of exemplary implementations of the invention will become apparent from the description, the claims, and the accompanying drawings in which:

DETAILED DESCRIPTION

Figure 1:
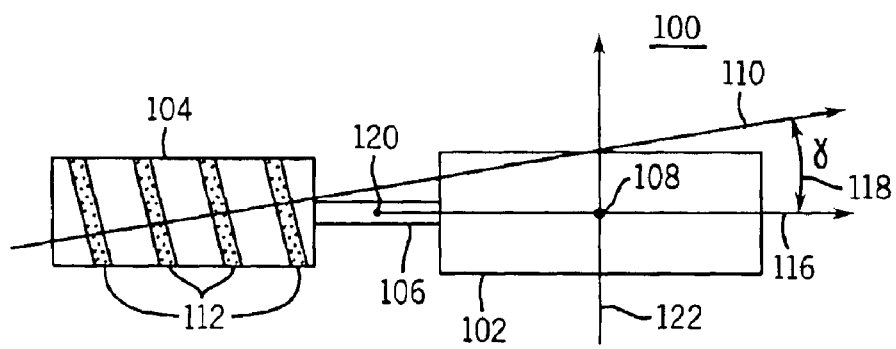
FIG. 1 is a representation of one exemplary implementation of an apparatus that comprises one or more drive components and one or more pendulous sensor components.

Turning to FIG. 1, an apparatus 100 in one example comprises a plurality of components such as hardware components. A number of such components can be combined or divided in one example of the apparatus 100. The apparatus 100 in one example comprises any (e.g., horizontal, oblique, or vertical) orientation, with the description and figures herein illustrating one exemplary orientation of the apparatus 100, for explanatory purposes.

The apparatus 100 in one example comprises a micro-electromechanical system ("MEMS") gyroscope and/or accelerometer as disclosed in U.S. Pat. No. 6,474,160 to Stewart, et. al. (issued Nov. 5, 2002, entitled "Counterbalanced Silicon Tuned Multiple Accelerometer-Gyro," and assigned to Northrop Grumman Corporation), which is hereby incorporated herein by reference in its entirely. For example, the apparatus 100 comprises one or more pendulous sensor components 102 and one or more drive components 104. A hinge 106 connects the pendulous sensor component 102 with the drive component 104.

The pendulous sensor component 102 in one example comprises a rectangular plate. The pendulous sensor component 102 comprises a center of mass 108. The pendulous sensor component 102 is suspended from the drive component 104 by the hinge 106. Upon subjection to a rotation (e.g., an angular rate) about an axis perpendicular to both a pendulous axis 116 and a pendulum acceleration sensitive axis 122, the pendulous sensor component 102 oscillates about the hinge 106 in a direction perpendicular to the motion of the drive component 104.

The drive component 104 actuates the pendulous sensor component 102. For example, the drive component 104 induces an oscillation in the pendulous sensor component 102. The motion ($X_d$) of the drive component 104 may be represented as $X_d = X_p \sin \omega_d t$ along a dither drive axis 110. $X_p$ represents a peak drive amplitude of the drive component 104 and $\omega_d$ represents a radian frequency of the drive component 104. The drive component 104 comprises one or more dither beams 112 (e.g., a dither beam suspension). The dither drive axis 110 is perpendicular to the one or more dither beams 112. Therefore, a misalignment of the dither beams 112 results in a misalignment of the dither drive axis 110. A portion of the acceleration of the drive component 104 couples to an output axis (e.g., the acceleration sensitive axis 122) if the dither beams 112 are not perpendicular to the pendulous axis 116. The portion of the acceleration of the drive component 104 coupled to the acceleration sensitive axis 122 increases quadrature and coupled with remodulation phase error introduces bias error. For example, the portion of the acceleration of the drive component 104 coupled to the acceleration sensitive axis 122 increases forces acting on the pendulous sensor component 102 that are in quadrature with desired rotation induced Coriolis forces. A pickoff from the acceleration sensitive axis 122 will sense the portion of the acceleration of the drive component 104. Thus, the pickoff senses a signal that is partly a result of the acceleration of the drive component 104.

A deep reactive ion process etches the one or more dither beams 112 of the drive component 104. In one example, the deep reactive ion etch of the dither beams 112 is perpendicular to an intended direction of motion of the drive component 104 (e.g., a vertical etch) and therefore the resulting dither drive axis 110 is parallel to the pendulous axis 116. In another example, the deep reactive ion etch of the dither beams 112 is non-perpendicular to the intended direction of motion of the drive component 104 (e.g., a non-vertical etch) and therefore the resulting dither drive axis 110 is non-parallel to the pendulous axis 116. For example, an angle of the dither drive axis 110 and an angle of the pendulous axis 116 differ by a misalignment angle ($\gamma$) 118. The portion of the acceleration of the drive component 104 that couples to the output axis may be represented as $Z_d = -\gamma \omega_d^2 X_p \sin \omega_d t$. The coupled portion of the acceleration of the drive component 104 is 90 degrees out of phase with a measured output of rotation by the pendulous sensor component 102.

The deep reactive ion etch of the dither beams 112 non-parallel to the pendulum acceleration sensitive axis 122 results in a misalignment between the pendulous sensor component 102 and the drive component 104. The misalignment introduces a quadrature to the pendulous sensor component 102. The quadrature coupled with remodulation error promotes an increase in bias of the micro-electromechanical system gyroscope. Instability in either the quadrature or the phase of remodulation introduces a bias error.

The hinge 106 in one example comprises a flexure point for the pendulous sensor component 102. The hinge 106 comprises a rotation axis 120 about which the pendulous sensor component 102 may oscillate. During fabrication, the hinge 106 is anisotropically etched as a last fabrication process step. The hinge 106 is anisotropically etched after the deep reactive ion etching of the dither beams 112. Therefore, upon identification of the direction of the dither drive axis 110 and the misalignment angle 118, the hinge 106 may be placed at a location that causes the pendulous axis 116, that intersects the rotation axis 120 and the center of mass 108, to be substantially parallel with the dither drive axis 110. For example, the location of the rotation axis 120 of the hinge 106 may be adjusted up or down relative to the pendulous sensor component 102 to alter an alignment of the acceleration sensitive axis 122 of the pendulous sensor component 102 and to promote a reduction in the misalignment angle 118. The acceleration sensitive axis 122 is perpendicular to the pendulous axis 116.

The adjustment in location of the hinge 106 is accomplished by introducing a head start etch on one side of the hinge 106 before a uniform etch to the final thickness has begun. Therefore, the hinge 106 will end up at an offset position. Thus, the quadrature due to the characteristic and repeatable non-vertical etching of the dither beams 112 is substantially reduced. Therefore, the risk of bias error due to unanticipated phase error in the mechanical remodulation method is also reduced.

Figure 2:
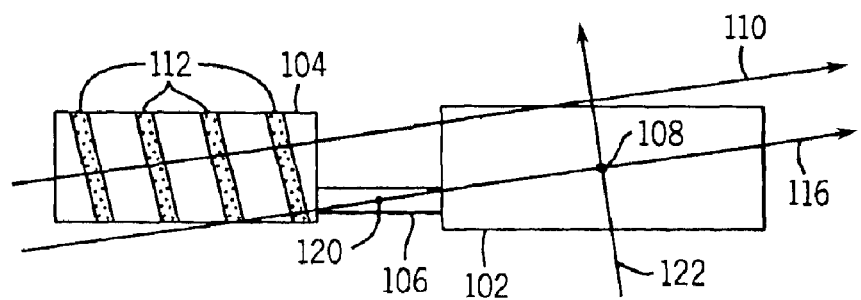
FIG. 2 is a representation of another exemplary implementation of an apparatus that comprises one or more drive components and one or more pendulous sensor components repositioned about a hinge component of the apparatus.

Turning to FIG. 2, an illustrative description of one exemplary repositioning of the hinge 106 is now presented, for explanatory purposes. Subsequent to the fabrication process step of the deep reactive ion etch of the dither beams 112 and prior to the fabrication process step of the anisotropic etch of the hinge 106, a fabrication process operator checks the orientation of the dither beams 112 for an indication of a misalignment with the pendulous sensor component 102. For example, the fabrication process operator determines an alignment between a major axis of the drive component 104 and the one or more dither beams. If the orientation of the dither beams 112 indicates a misalignment between the dither drive axis 110 and the pendulous axis 116, then the anisotropic etch of the hinge 106 fabrication process step may position the hinge 106 at a location that causes the pendulous axis 116 to be substantially parallel with the dither drive axis 110. As shown in FIG. 2, upon determination of the misalignment, the fabrication process operator positioned the hinge 106 to reduce a difference between the angle of the dither drive axis 110 and the angle of the pendulous axis 116. For example, the position of the hinge 106 reduces the misalignment angle 118.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An electromechanical system, comprising:
   a drive component that comprises a drive axis;
   a pendulous sensor component that comprises a center of mass;
   a hinge component that comprises a rotation axis;
   wherein the drive component makes a determination of a drive direction, wherein upon the determination of the drive direction, the drive component determines an alignment of a pendulous axis, that intersects the center of mass of the pendulous sensor component and the rotation axis of the hinge component, with the drive axis of the drive component;
   wherein the drive component and the pendulous sensor component are coupled with the hinge component, wherein a location of the hinge component causes the alignment of the pendulous axis to be substantially parallel with the drive direction of the drive component.

2. The system of claim 1, wherein the drive component comprises one or more dither beams, wherein the drive component makes the determination of the drive direction based on a determination of an alignment of one or more of the one or more dither beams with the drive axis.

3. The system of claim 2, wherein the drive component employs an acceleration to induce one or more oscillations at the pendulous sensor component, wherein the pendulous sensor component measures a portion of the acceleration to make the determination of the alignment of the one or more of the one or more dither beams with the drive axis.

4. The system of claim 3, wherein the drive component employs a portion of the acceleration to increase a quadrature value of the pendulous sensor component, wherein the location of the hinge component causes a reduction in the quadrature value of the pendulous sensor component.

5. The system of claim 1, wherein the drive component comprises one or more dither beams with one or more etchings, wherein the drive component employs the one or more etchings of the one or more dither beams to determine the alignment of the pendulous axis with the drive axis.

6. The system of claim 5, wherein the drive component employs the one or more etchings to increase a quadrature value of the pendulous sensor component, wherein the location of the hinge component causes a reduction in the quadrature value of the pendulous sensor component.

7. The system of claim 1, wherein the hinge component comprises one or more etchings, wherein the hinge component employs the one or more etchings to cause the alignment of the pendulous axis to be substantially parallel with the drive direction of the drive component.

8. The system of claim 1, wherein the alignment of the pendulous axis with the drive axis comprises a misalignment;
   wherein the drive component causes the pendulous sensor component to oscillate about the hinge component based on the misalignment, wherein a location of the hinge component corrects the misalignment to cause the pendulous axis to be substantially parallel with the drive direction of the drive component.

9. The system of claim 1, wherein the drive component comprises one or more dither beams and one or more etchings, wherein the hinge component comprises one or more etchings, wherein the drive component makes a determination of an alignment of one or more of the one or more dither beams with the drive axis;
   wherein the dither drive component makes the determination of the drive direction based on the alignment of the one or more of the one or more dither beams with the drive axis;
   wherein upon determination of the drive direction, the drive component employs the one or more etchings of the drive component to make the determination of the alignment of the pendulous axis with the drive axis;
   wherein upon determination of the alignment of the pendulous axis with the drive axis, the hinge component employs the one or more etchings of the hinge component to cause the alignment of the pendulous axis to be substantially parallel with the drive direction of the drive component.

10. A method, an electromechanical system that comprises a drive component that comprises a drive axis and one or more dither beams, wherein the drive component actuates a pendulous sensor component that comprises a center of mass, the method comprising the steps of:
    determining an alignment of the drive axis with the one or more dither beams;
    identifying a drive direction of the drive component based on the alignment of the drive axis with the one or more dither beams; and
    positioning a hinge component, that connects the drive component and the pendulous sensor component, at a location that causes a pendulous axis, that intersects a rotation axis of the hinge component and the center of mass of the pendulous sensor component, to be substantially parallel with the drive direction of the drive component.

11. The method of claim 10, wherein the step of determining the alignment of the drive axis with the one or more dither beams comprises the steps of:
    employing an acceleration to induce one or more oscillations at the pendulous sensor component; and
    measuring a portion of the acceleration to determine the alignment of the drive axis with the one or more dither beams.

12. The method of claim 11, wherein the step of measuring the portion of the acceleration to determine the alignment of the drive axis with the one or more dither beams comprises the steps of:
    increasing a quadrature value of the pendulous sensor component based on the alignment of the drive axis with the one or more dither beams; and
    positioning the hinge component to reduce the quadrature value of the pendulous sensor component.

13. The method of claim 10, wherein the one or more dither beams comprise one or more etchings, wherein the step of identifying the drive direction of the drive component based on the alignment of the drive axis with the one or more dither beams comprises the steps of:
    determining the alignment of the one or more dither beams with the drive direction through employment of the one or more etchings;
    increasing a quadrature value of the pendulous sensor component based on the alignment of the one or more dither beams with the drive direction; and
    positioning the hinge component to reduce the quadrature value of the pendulous sensor component.

14. The method of claim 10, wherein the hinge component comprises one or more etchings, wherein the step of positioning the hinge component at the location that causes the pendulous axis to be substantially parallel with the drive direction of the drive component comprises the steps of:
    determining the location of the hinge component that causes the pendulous axis to be substantially parallel with the drive direction of the drive component through employment of the one or more etchings; and employing the location of the hinge component to reduce a quadrature value of the pendulous sensor component.

15. The method of claim 10, the method further comprising the steps of:

actuating the pendulous sensor component with the drive component; and causing the pendulous sensor component to oscillate about the hinge component.

16. A process, comprising the steps of:

etching one or more dither beams of a drive component with a deep reactive ion process; and aligning a pendulous axis, that intersects a center of mass of a pendulous sensor component and a rotation axis of a hinge component, with a drive axis through employment of the deep reactive ion process.

17. The process of claim 16, wherein the step of aligning the pendulous axis with the drive axis through employment of the deep reactive ion process comprises the steps of:

increasing a quadrature value of the pendulous sensor component through employment of the deep reactive ion process; and locating the hinge component to promote a reduction in the quadrature value of the pendulous sensor component.

18. The process of claim 17, wherein the drive component and the pendulous sensor component are coupled with the hinge component in a non-parallel alignment, wherein the step of locating the hinge component to promote the reduction in the quadrature value of the pendulous sensor component comprises the steps of:

etching the hinge component with an anisotropic process to alter the non-parallel alignment; and aligning the pendulous axis with the drive direction of the drive component in a substantially parallel manner through employment of the anisotropic process.

19. The process of claim 17, wherein the drive component and the pendulous sensor component are coupled with the hinge component, wherein the step of locating the hinge component to promote the reduction in the quadrature value of the pendulous sensor component comprises the steps of:

etching the hinge component with an anisotropic process; and reducing the quadrature value of the pendulous sensor component through employment of the anisotropic process.

20. The process of claim 16, wherein an electromechanical system is produced according to the process, wherein the electromechanical system comprises the hinge component, the drive component, and the pendulous sensor component.

* * * * *